(12) United States Patent
Nguyen et al.

(10) Patent No.: US 8,710,907 B2
(45) Date of Patent: Apr. 29, 2014

(54) CLOCK GENERATOR CIRCUIT FOR A CHARGE PUMP

(75) Inventors: Qui Vi Nguyen, San Jose, CA (US); Feng Pan, Fremont, CA (US); Jonathan H. Huynh, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 876 days.

(21) Appl. No.: 12/144,808

(22) Filed: Jun. 24, 2008

(65) Prior Publication Data

US 2009/0315616 A1    Dec. 24, 2009

(51) Int. Cl.
  *G05F 1/10*   (2006.01)
  *H02M 3/07*   (2006.01)

(52) U.S. Cl.
  CPC .................................. *H02M 3/073* (2013.01)
  USPC ....................................................... 327/536

(58) Field of Classification Search
  USPC ......... 327/217, 261, 263, 266, 268, 276, 280, 327/287, 291–295, 298, 299, 535, 536; 363/59, 60
  See application file for complete search history.

(56) References Cited

U.S. PATENT DOCUMENTS

| | | | |
|---|---|---|---|
| 3,697,860 A | 10/1972 | Baker | |
| 4,271,461 A | 6/1981 | Hoffmann et al. | |
| 4,511,811 A | 4/1985 | Gupta | |
| 4,583,157 A | 4/1986 | Kirsch et al. | |
| 4,636,748 A | 1/1987 | Latham | |
| 4,736,121 A | 4/1988 | Cini et al. | |
| 4,888,738 A | 12/1989 | Wong et al. | |
| 5,140,182 A | 8/1992 | Ichimura | |
| 5,168,174 A | 12/1992 | Naso et al. | |
| 5,175,706 A | 12/1992 | Edme | |
| 5,263,000 A | 11/1993 | Van Buskirk et al. | |
| 5,335,198 A | 8/1994 | Van Buskirk et al. | |
| 5,392,205 A | 2/1995 | Zavaleta | |
| 5,436,587 A | 7/1995 | Cernea | |
| 5,483,434 A | 1/1996 | Seesink | |
| 5,508,971 A | 4/1996 | Cernea et al. | |
| 5,521,547 A | 5/1996 | Tsukada | |
| 5,563,779 A | 10/1996 | Cave et al. | |
| 5,563,825 A | 10/1996 | Cernea et al. | |

(Continued)

FOREIGN PATENT DOCUMENTS

| DE | 10 2007 026290 A1 | 7/2008 |
|---|---|---|
| EP | 0 382 929 A | 8/1990 |

(Continued)

OTHER PUBLICATIONS

Feng Pan et al., "Charge Pump Circuit Design", McGraw-Hill, 2006, 26 pages.

(Continued)

*Primary Examiner* — Sibin Chen
(74) *Attorney, Agent, or Firm* — Davis Wright Tremaine LLP

(57) ABSTRACT

A charge pump system is formed on an integrated circuit that can be connected to an external power supply. The system includes a charge pump and a clock generator circuit. The clock circuit is coupled to provide a clock output, at whose frequency the charge pump operates and generates an output voltage from an input voltage. The clock frequency is a decreasing function of the voltage level of the external power supply. This allows for reducing power consumption in the charge pump system formed on a circuit connectable to an external power supply.

9 Claims, 3 Drawing Sheets

(56) References Cited

U.S. PATENT DOCUMENTS

| | | | |
|---|---|---|---|
| 5,568,424 | A | 10/1996 | Cernea et al. |
| 5,570,315 | A | 10/1996 | Tanaka et al. |
| 5,592,420 | A | 1/1997 | Cernea et al. |
| 5,596,532 | A | 1/1997 | Cernea et al. |
| 5,602,794 | A | 2/1997 | Javanifard et al. |
| 5,621,685 | A | 4/1997 | Cernea et al. |
| 5,625,544 | A | 4/1997 | Kowshik et al. |
| 5,693,570 | A | 12/1997 | Cernea et al. |
| 5,732,039 | A | 3/1998 | Javanifard et al. |
| 5,734,286 | A | 3/1998 | Takeyama et al. |
| 5,767,735 | A | 6/1998 | Javanifard et al. |
| 5,781,473 | A | 7/1998 | Javanifard et al. |
| 5,801,987 | A | 9/1998 | Dinh |
| 5,818,766 | A | 10/1998 | Song |
| 5,828,596 | A | 10/1998 | Takata et al. |
| 5,903,495 | A | 5/1999 | Takeuchi et al. |
| 5,943,226 | A | 8/1999 | Kim |
| 5,945,870 | A | 8/1999 | Chu et al. |
| 5,969,565 | A | 10/1999 | Naganawa |
| 5,973,546 | A | 10/1999 | Le et al. |
| 5,982,222 | A * | 11/1999 | Kyung ........................... 327/536 |
| 6,008,690 | A | 12/1999 | Takeshima et al. |
| 6,018,264 | A | 1/2000 | Jin |
| 6,023,187 | A | 2/2000 | Camacho et al. |
| 6,026,002 | A | 2/2000 | Viehmann |
| 6,104,225 | A * | 8/2000 | Taguchi et al. ............... 327/298 |
| 6,107,862 | A | 8/2000 | Mukainakano et al. |
| 6,134,145 | A | 10/2000 | Wong |
| 6,151,229 | A | 11/2000 | Taub et al. |
| 6,154,088 | A | 11/2000 | Chevallier et al. |
| 6,188,590 | B1 | 2/2001 | Chang et al. |
| 6,198,645 | B1 | 3/2001 | Kotowski et al. |
| 6,208,198 | B1 | 3/2001 | Lee |
| 6,249,445 | B1 | 6/2001 | Sugasawa |
| 6,249,898 | B1 | 6/2001 | Koh et al. |
| 6,275,096 | B1 | 8/2001 | Hsu et al. |
| 6,285,622 | B1 | 9/2001 | Haraguchi et al. |
| 6,297,687 | B1 | 10/2001 | Sugimura |
| 6,307,425 | B1 | 10/2001 | Chevallier et al. |
| 6,314,025 | B1 | 11/2001 | Wong |
| 6,320,428 | B1 | 11/2001 | Atsumi et al. |
| 6,320,796 | B1 | 11/2001 | Voo et al. |
| 6,329,869 | B1 | 12/2001 | Matano |
| 6,344,959 | B1 | 2/2002 | Milazzo |
| 6,344,984 | B1 | 2/2002 | Miyazaki |
| 6,359,798 | B1 | 3/2002 | Han et al. |
| 6,369,642 | B1 | 4/2002 | Zeng et al. |
| 6,370,075 | B1 | 4/2002 | Haeberli et al. |
| 6,385,107 | B1 | 5/2002 | Bedarida et al. |
| 6,400,202 | B1 * | 6/2002 | Fifield et al. ................ 327/291 |
| 6,404,274 | B1 | 6/2002 | Hosono et al. |
| 6,424,570 | B1 | 7/2002 | Le et al. |
| 6,445,243 | B2 | 9/2002 | Myono |
| 6,456,170 | B1 * | 9/2002 | Segawa et al. ............... 331/143 |
| 6,476,666 | B1 | 11/2002 | Palusa et al. |
| 6,486,728 | B2 | 11/2002 | Kleveland |
| 6,518,830 | B2 | 2/2003 | Gariboldi et al. |
| 6,525,614 | B2 | 2/2003 | Tanimoto |
| 6,525,949 | B1 | 2/2003 | Johnson et al. |
| 6,531,792 | B2 | 3/2003 | Oshio |
| 6,538,930 | B2 | 3/2003 | Ishii et al. |
| 6,545,529 | B2 | 4/2003 | Kim |
| 6,556,465 | B2 | 4/2003 | Wong et al. |
| 6,577,535 | B2 | 6/2003 | Pasternak |
| 6,606,267 | B2 | 8/2003 | Wong |
| 6,724,241 | B1 | 4/2004 | Bedarida et al. |
| 6,734,718 | B1 | 5/2004 | Pan |
| 6,760,262 | B2 | 7/2004 | Haeberli et al. |
| 6,781,440 | B2 | 8/2004 | Huang |
| 6,798,274 | B2 | 9/2004 | Tanimoto |
| 6,819,162 | B2 | 11/2004 | Pelliconi |
| 6,834,001 | B2 | 12/2004 | Myono |
| 6,859,091 | B1 | 2/2005 | Nicholson et al. |
| 6,878,981 | B2 | 4/2005 | Eshel |
| 6,891,764 | B2 | 5/2005 | Li |
| 6,894,554 | B2 | 5/2005 | Ito |
| 6,922,096 | B2 | 7/2005 | Cernea |
| 6,927,441 | B2 | 8/2005 | Pappalardo et al. |
| 6,933,768 | B2 | 8/2005 | Hausmann |
| 6,944,058 | B2 | 9/2005 | Wong |
| 6,975,135 | B1 | 12/2005 | Bui |
| 6,985,397 | B2 | 1/2006 | Tokui et al. |
| 6,990,031 | B2 | 1/2006 | Hashimoto et al. |
| 6,995,603 | B2 | 2/2006 | Chen et al. |
| 7,002,381 | B1 | 2/2006 | Chung |
| 7,023,260 | B2 | 4/2006 | Thorp et al. |
| 7,030,683 | B2 | 4/2006 | Pan et al. |
| 7,113,023 | B2 | 9/2006 | Cernea |
| 7,116,154 | B2 | 10/2006 | Guo |
| 7,116,155 | B2 | 10/2006 | Pan |
| 7,120,051 | B2 | 10/2006 | Gorobets |
| 7,129,759 | B2 | 10/2006 | Fukami |
| 7,135,910 | B2 | 11/2006 | Cernea |
| 7,135,911 | B2 | 11/2006 | Imamiya |
| 7,205,682 | B2 * | 4/2007 | Kuramori ........................ 307/80 |
| 7,208,996 | B2 | 4/2007 | Suzuki et al. |
| 7,224,591 | B2 | 5/2007 | Kaishita et al. |
| 7,227,780 | B2 | 6/2007 | Komori et al. |
| 7,239,192 | B2 | 7/2007 | Tailliet |
| 7,253,676 | B2 | 8/2007 | Fukuda et al. |
| 7,259,612 | B2 | 8/2007 | Saether |
| 7,276,960 | B2 | 10/2007 | Peschke |
| 7,279,957 | B2 | 10/2007 | Yen |
| 7,345,335 | B2 | 3/2008 | Watanabe |
| 7,368,979 | B2 | 5/2008 | Govindu et al. |
| 7,397,677 | B1 | 7/2008 | Collins et al. |
| 7,436,241 | B2 | 10/2008 | Chen et al. |
| 7,468,628 | B2 * | 12/2008 | Im et al. ........................ 327/548 |
| 7,495,500 | B2 | 2/2009 | Al-Shamma et al. |
| 7,521,978 | B2 | 4/2009 | Kim et al. |
| 7,554,311 | B2 | 6/2009 | Pan |
| 7,579,902 | B2 | 8/2009 | Frulio et al. |
| 7,579,903 | B2 | 8/2009 | Oku |
| 7,671,572 | B2 | 3/2010 | Chung |
| 7,696,812 | B2 | 4/2010 | Al-Shamma et al. |
| 7,772,914 | B2 | 8/2010 | Jung |
| 7,795,952 | B2 | 9/2010 | Lui et al. |
| 7,956,673 | B2 | 6/2011 | Pan |
| 7,969,235 | B2 | 6/2011 | Pan |
| 7,973,592 | B2 | 7/2011 | Pan |
| 8,093,953 | B2 | 1/2012 | Pierdomenico et al. |
| 8,159,091 | B2 | 4/2012 | Yeates |
| 8,193,853 | B2 | 6/2012 | Hsieh et al. |
| 8,242,834 | B2 | 8/2012 | Chuang et al. |
| 8,339,183 | B2 | 12/2012 | Htoo et al. |
| 2002/0008566 | A1 | 1/2002 | Taito et al. |
| 2002/0014908 | A1 | 2/2002 | Lauterbach |
| 2002/0075706 | A1 | 6/2002 | Foss et al. |
| 2002/0130701 | A1 | 9/2002 | Kleveland |
| 2002/0130704 | A1 | 9/2002 | Myono et al. |
| 2002/0140463 | A1 | 10/2002 | Cheung |
| 2003/0128560 | A1 | 7/2003 | Saiki et al. |
| 2003/0214346 | A1 | 11/2003 | Pelliconi |
| 2004/0046603 | A1 | 3/2004 | Bedarida et al. |
| 2005/0030088 | A1 | 2/2005 | Cernea |
| 2005/0093614 | A1 | 5/2005 | Lee |
| 2005/0195017 | A1 | 9/2005 | Chen et al. |
| 2005/0237103 | A1 | 10/2005 | Cernea |
| 2005/0248386 | A1 | 11/2005 | Pan et al. |
| 2006/0098505 | A1 | 5/2006 | Cho et al. |
| 2006/0114053 | A1 | 6/2006 | Sohara et al. |
| 2006/0244518 | A1 | 11/2006 | Byeon et al. |
| 2006/0250177 | A1 | 11/2006 | Thorp et al. |
| 2007/0001745 | A1 | 1/2007 | Yen |
| 2007/0053216 | A1 | 3/2007 | Alenin |
| 2007/0069805 | A1 | 3/2007 | Choi et al. |
| 2007/0126494 | A1 | 6/2007 | Pan |
| 2007/0139099 | A1 | 6/2007 | Pan |
| 2007/0139100 | A1 | 6/2007 | Pan |
| 2007/0210853 | A1 | 9/2007 | Maejima |
| 2007/0211502 | A1 | 9/2007 | Komiya |
| 2007/0222498 | A1 | 9/2007 | Choy et al. |
| 2007/0229149 | A1 | 10/2007 | Pan et al. |
| 2008/0012627 | A1 | 1/2008 | Kato |

(56) References Cited

U.S. PATENT DOCUMENTS

| | | |
|---|---|---|
| 2008/0024096 A1 | 1/2008 | Pan |
| 2008/0024198 A1 | 1/2008 | Bitonti et al. |
| 2008/0042731 A1 | 2/2008 | Daga et al. |
| 2008/0111604 A1 | 5/2008 | Boerstler et al. |
| 2008/0116963 A1 | 5/2008 | Jung |
| 2008/0136500 A1 | 6/2008 | Frulio et al. |
| 2008/0157852 A1 | 7/2008 | Pan |
| 2008/0157859 A1 | 7/2008 | Pan |
| 2008/0218134 A1 | 9/2008 | Kawakami et al. |
| 2008/0239802 A1 | 10/2008 | Thorp |
| 2008/0239856 A1 | 10/2008 | Thorp |
| 2008/0278222 A1 | 11/2008 | Conti et al. |
| 2008/0307342 A1 | 12/2008 | Furches et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0063918 A1 | 3/2009 | Chen et al. |
| 2009/0091366 A1 | 4/2009 | Baek et al. |
| 2009/0121780 A1 | 5/2009 | Chen et al. |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Ragavan |
| 2009/0174441 A1 | 7/2009 | Gebara et al. |
| 2009/0184697 A1 | 7/2009 | Park |
| 2009/0219077 A1 | 9/2009 | Pietri et al. |
| 2009/0296488 A1 | 12/2009 | Nguyen et al. |
| 2009/0315598 A1 | 12/2009 | Namekawa |
| 2009/0315616 A1 | 12/2009 | Nguyen et al. |
| 2009/0322413 A1 | 12/2009 | Huynh et al. |
| 2010/0019832 A1 | 1/2010 | Pan |
| 2010/0033232 A1 | 2/2010 | Pan |
| 2010/0074034 A1 | 3/2010 | Cazzaniga |
| 2010/0085794 A1 | 4/2010 | Chen et al. |
| 2010/0244935 A1 | 9/2010 | Kim et al. |
| 2010/0302877 A1 | 12/2010 | Bang |
| 2011/0026329 A1 | 2/2011 | Wada |
| 2011/0133820 A1 | 6/2011 | Pan |
| 2011/0133821 A1 | 6/2011 | Honda |
| 2011/0148509 A1 | 6/2011 | Pan |
| 2011/0156803 A1 | 6/2011 | Yap et al. |
| 2011/0176370 A1 | 7/2011 | Izumi et al. |
| 2011/0254615 A1 | 10/2011 | Raghunathan et al. |
| 2013/0162229 A1 | 6/2013 | Chan |

FOREIGN PATENT DOCUMENTS

| | | |
|---|---|---|
| EP | 0 780 515 A | 6/1997 |
| JP | 2007-020268 A | 1/2007 |
| WO | 01/06336 A1 | 1/2001 |
| WO | WO 2006/132757 | 12/2006 |

OTHER PUBLICATIONS

Louie Pylarinos et al., "Charge Pumps: An Overview", Department of Electrical and Computer Engineering University of Toronto, 7 pages.

Ang et al., "An On-Chip Voltage Regulator Using Switched Decoupling Capacitors," 2000 IEEE International Solid-State Circuits Conference, 2 pages.

Patent Application for U.S. Appl. No. 12/973,641 filed Dec. 20, 2010, 26 pages.

Patent Application for U.S. Appl. No. 12/973,493 filed Dec. 20, 2010, 28 pages.

Patent Application for U.S. Appl. No. 13/228,605, filed Sep. 9, 2011, 21 pages.

\* cited by examiner

CLOCK GENERATOR CIRCUIT FOR A CHARGE PUMP

FIELD OF THE INVENTION

This invention pertains generally to the field of charge pumps and more particularly to clock generation circuit for use with a charge pump.

BACKGROUND

Charge pumps use a switching process to provide a DC output voltage larger than its DC input voltage. In general, a charge pump will have a capacitor coupled to switches between an input and an output. During one clock half cycle, the charging half cycle, the capacitor couples in parallel to the input so as to charge up to the input voltage. During a second clock half cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to reduce the amount of layout area and the current consumption requirements of pumps.

FIG. 2 is a top-level block diagram of a typical charge pump arrangement. The designs described here differ from the prior art in details of how the pump section 201. As shown in FIG. 2, the pump 201 has as inputs a clock signal and a voltage Vreg and provides an output Vout. The high (typically Vext from the external power supply) and low (ground) connections are not explicitly shown. The voltage Vreg is provided by the regulator 203, which has as inputs a reference voltage Vref from an external voltage source and the output voltage Vout. The regulator block 203 regulates the value of Vreg such that the desired value of Vout can be obtained. The pump section 201 will typically have cross-coupled elements, such at described below for the exemplary embodiments. (A charge pump is typically taken to refer to both the pump portion 201 and the regulator 203, when a regulator is included, although in some usages "charge pump" refers to just the pump section 201.)

In a typical charge pump arrangement, a Dickson type pump for example, the pump 201 will have a capacitor (such as 5 of FIG. 1) for each stage, where one plate is driven by input voltage to the pump or a previous stage and the other plate receives a clock signal. In path providing this clock signal there will generally be some parasitic capacitance, $C_{par}$, driven at the clock frequency $f_{clock}$, which leads to the generation of current and a corresponding power consumption. The amount of current consumption will also be dependent of the value of the external voltage supply, Vext, since the clock drivers typically use Vext to increase pump efficiency, and be of the form $f_{clock}C_{par}$Vext. Consequently, as supply the supply voltage increases, the pump will consume more power due to these clock driver parasitics. (The value Vext is from the power supply external to the device on which the charge pump is formed, as opposed to the high level on device, typically referred to as Vcc for example, which is external to pump, but not to the system.)

SUMMARY OF THE INVENTION

In a first aspect, a charge pump system is formed on an integrated circuit that can be connected to an external power supply. The system includes a charge pump and a clock generator circuit. The clock circuit is coupled to provide a clock output, at whose frequency the charge pump operates and generates an output voltage from an input voltage. The clock frequency is a decreasing function of the voltage level of the external power supply.

In another aspect, a method is described for reducing power consumption in a charge pump system formed on a circuit connectable to an external power supply. This includes receiving a voltage level from the external power supply at a clock circuit and generating in the clock circuit a clock signal having a frequency that is a decreasing function of the voltage level of the external power supply. The clock signal is provided to a charge pump, which operates at the frequency of this clock signal to generate an output voltage from an input voltage.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

The typical pump design uses a constant clock frequency across supply voltage levels. As noted in the Background, as the supply voltage increases, because of clock driver parasitics, the pump consumes more power. To ameliorate this, the following presents a clock generator design that tracks the clock driver period with the external pump supply voltage. More specifically, the clock generator will have a frequency that is a decreasing function of the supply voltage, so that as the supply voltage increases, the frequency will decrease and vice versa. Consequently, the design will save on pump power consumption while maintaining the pump's I-V curve.

More information on charge pumps, such Dickson type pumps and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspeqcts and designs can be found in U.S. Pat. Nos. 5,436,587; 6,370,075; 6,556,465; 6,760,262; 6,922,096; and 7,135,910; and applications Ser. No. 10/842,910 filed on May 10, 2004; Ser. No. 11/295,906 filed on Dec. 6, 2005; Ser. No. 11/303,387 filed on Dec. 16, 2005; Ser. No. 11/497,465 filed on Jul. 31, 2006; Ser. No. 11/523,875 filed on Sep. 19, 2006; Ser. Nos. 11/845,903 and 11/845,939, both filed Aug. 28, 2007; Ser. Nos . 11/955,221 and 11/995,237, both filed on Dec. 12, 2007; and Ser. No. 12/135,945 filed on Jun. 9, 2008.

Figure 1A:
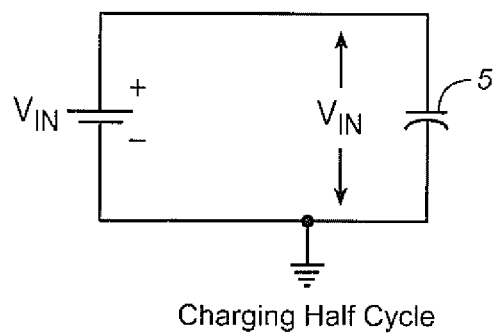
FIG. 1a is a simplified circuit diagram of the charging half cycle in a generic charge pump.
Figure 1B:
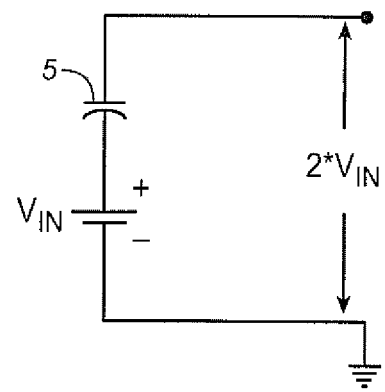
FIG. 1b is a simplified circuit diagram of the transfer half cycle in a generic charge pump.
Figure 2:
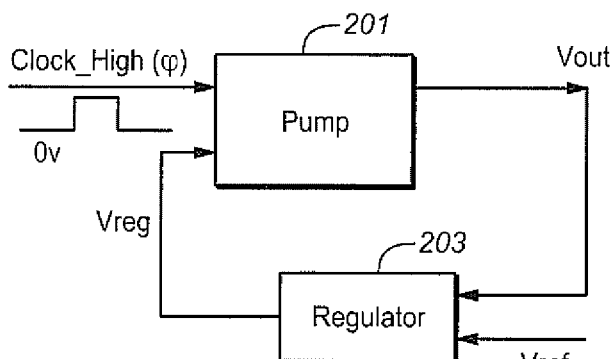
FIG. 2 is a top-level block diagram for a regulated charge pump.
Figure 3:
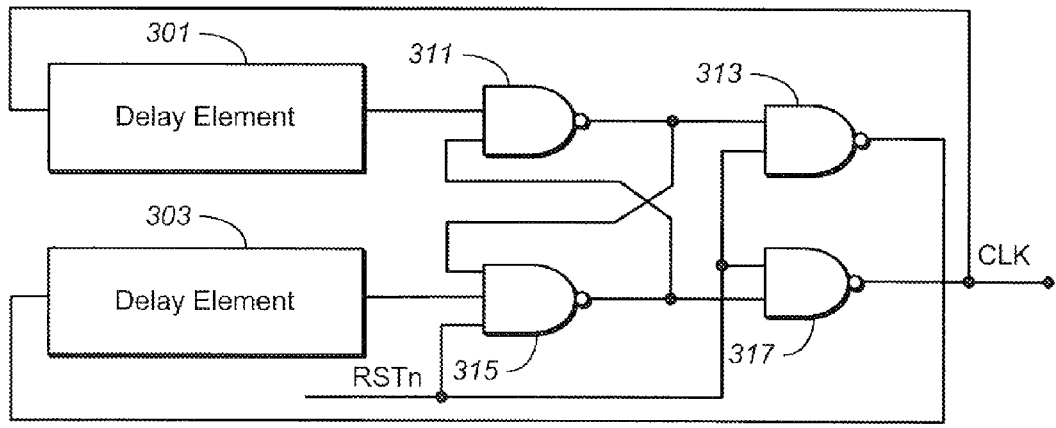
FIG. 3 is a general clock generator.

FIG. 3 is a block diagram of an exemplary clock generator circuit. This shows a latch formed of the gates 311, 313, 315, and 317 that has as its output the clock signal (CLK) used for the charge pump. The NAND gate 315 has as an input a reset signal RSTn to enable the latch. The output clock signal CLK from gate 317 is fed back into the delay element 301, which in turn supplies an input to the gate 311. The output of gate 313 is fed back to a similar delay element 303, which in turn supplies the gate 315. The output CLK begins clocking when RSTn is switched to logic high. If the period of the delay elements are each $\Delta t_{delay}$, then the period for the clock signal CLK will be $\Delta t_{period} = 2\Delta t_{delay}$. FIG. 3 is just one example of a clock generator circuit and other arranges for latch shown here can be used to generator a clock signal from a delay element or elements.

Figure 4A:
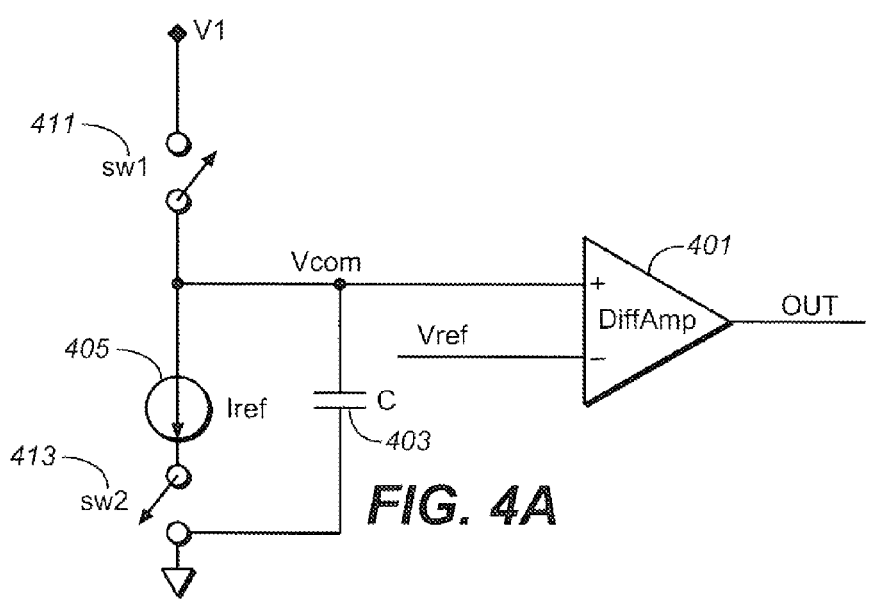
FIGS. 4A and 4B illustrate a clock generator circuit with a period not directly dependent on the external power supply level.

FIG. 4A shows an example of a delay element that exhibits the sort of behavior typical in the prior art, where the amount of delay does not vary with the level of the external power supply. The output (OUT) of the delay element, which would be fed into 311 and 315 in FIG. 3 is the output from DiffAmp 401, whose − input is connected up to a reference voltage Vref. A pair of switches SW1 411 and SW2 413 are connected in series between a supply level V1 and ground, with a current source 405 with a value of Iref connected in between. In the example here, V1 would be the high voltage level on the chip, Vcc, with a value that of, say, Vcc=2.5V here. The voltage on the node above the current source 405, Vcom, is fed into the + input of amp 401. A capacitor 403 is also connected between the line at Vcom and ground. The switches 411 and 413 are controlled by the input from either 317 (CLK) or 313 as shown on FIG. 3 to alternately open and close them.

Initially, with switch SW1 411 closed and SW2 413 open, Vcom will precharge up to V1. At $t_0$=0, SW1 411 is opened and SW2 413 is closed, so that Vcom is discharged by Iref through the current source 405. The time, $\Delta t_{delayO}$, it takes to switch OUT from High to Low is then:

$$\Delta t_{delayO} = \frac{C}{Iref}(V_1 - Vref).$$

Since each of the quantities does not have any real dependence on the value of the external power supply voltage Vext, the delay—and consequently the clock period—will not depend on the value of the external power supply either. (Again, V1 would here be the on chip Vcc value, not the external supply level.)

Figure 4B:
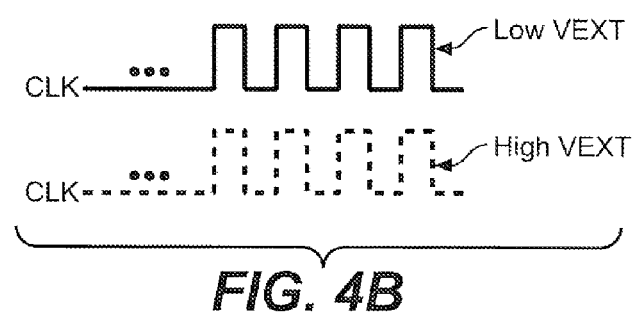

FIG. 4B shows the clock signal from clock generator using a delay element such as in FIG. 4A. In the top waveform, the external voltage Vext is about the same as the V1 value, say the Vcc value of 2.5V. The lower waveform is for a higher external supply voltage, say Vext=3.5V. The frequency is the same. Consequently, there is no compensation from the pump's clock frequency to offset the increase in power consumption due to the increase in Vext.

Figure 5A:
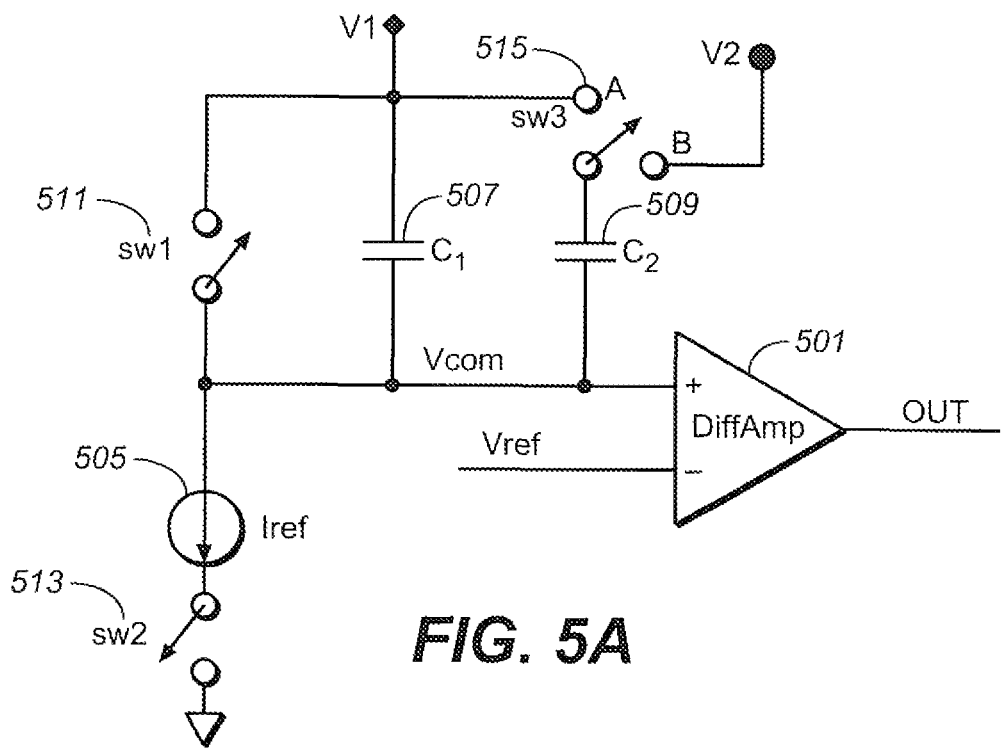
FIGS. 5A and 5B show an exemplary embodiment of a clock generator circuit whose frequency is a decreasing function of the power supply voltage.

FIG. 5A is an exemplary embodiment of a delay element whose delay increases with the external poser supply voltage level. Consequently, the frequency of the clock circuit using such a delay element will be a decreasing function of the power supply voltage. The arrangement of FIG. 5A is just an exemplary embodiment and other arrangements can also be used that provide a delay that is a decreasing function of the external power supply.

In FIG. 5A, the output (OUT) of the delay element, which would be fed into 311 and 315 in FIG. 3 is again the output from DiffAmp 501, whose − input is connected up to a reference voltage Vref. And as before a pair of switches SW1 511 and SW2 513 are connected in series between a supply level V1 and ground, with a current source 505 with a value of Iref connected in between. In the example here, V1 would be the high voltage level on the chip, Vcc, with a value that of, say, Vcc=2.5V here, and Vref would typically be a bandgap reference value less than V1, with a value of, say, Vref=1.2V here. The voltage on the node above the current source 505, Vcom, is fed into the + input of amp 501. The level on Vcom is now arranged differently.

A capacitor C1 507 is connected between the line at Vcom and V1. A second capacitor C2 509 is also connected on the one side to the line at Vcom and at the other side through a switch SW3 515 to, when position A, V1 or, when in position B to V2, where V2 is here the external supply voltage, V2=Vext. The switches SW1 511, SW2 513, and SW3 515 are controlled but the input from either 317 (CLK) or 313 as shown on FIG. 3 to alternately open and close them.

Starting initially with SW1 511 closed, SW2 513 open, and SW3 515 at position A, the top plates of the both C1 507 and C2 509 are at V1 and Vcom is precharged to V1. Then, at $t_0$=0, SW1 511 is opened, SW2 513 is closed, and SW3 is at position B and connected to V2, so that Vcom is discharged by Iref through the current source 505. The time, $\Delta t_{delayNew}$, it takes to switch OUT from High to Low is then:

$$\Delta t_{delayNew} = \frac{C_1 + C_2}{Iref}(Vcom - Vref).$$

Right after fed back input changes the switches at $t_0$=0, Vcom is given by:

$$\text{At } t_{0+}: Vcom = \frac{V_1 C_1 + V_2 C_2}{C_1 + C_2}.$$

Consequently, this gives $$\Delta t_{delayNew} = \frac{C_1(V_1 - Vref) - C_2 * Vref}{Iref} + \frac{C_2 * V_2}{Iref}$$

As before in FIG. 4A, V1 would be the high voltage level on the chip, Vcc, with a value that of, say, Vcc=2.5V here. The Vref and Iref values will also be fixed, so that $\Delta t_{delayNew}$ will increase/decrease as V2 increases/decreases. Consequently, by taking V2=Vext, the frequency (being inversely related to $\Delta t_{delayNew}$) will be a decreasing function of Vext.

Figure 5B:
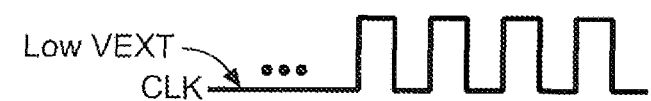
Figure 5B:
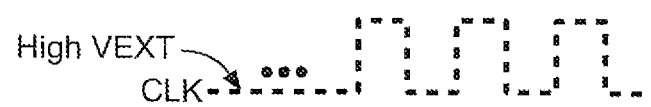

This behavior is illustrated in FIG. 5B. The upper waveform corresponds to a lower Vext value, say 2.5V, and the lower waveform corresponds to a higher value of, say 3.9V. As shown, the clock frequency decreases for the higher Vext supply value.

As discussed in the Background, power consumption of the charge pump system has a contribution of the product of the external voltage and the clock frequency. By having the frequency as a decreasing function of Vext, the dependency of their product on the external supply level can be reduced, with the parameters (Vref, C1, . . . ) chosen accordingly. For example, if C2 is taken so that:

$$C_2 = \frac{C_1(V_1 - Vref)}{Vref},$$

then, putting this into the relation for $\Delta t_{delayNew}$ gives $f_{clock} \sim 1/$ Vext. Consequently, the dependence on Vext in the current consumption due to the parasitic capacitance will cancel out.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump system formed on an integrated circuit connectable to receive a voltage level from a power supply external to the integrated circuit, including:
   a charge pump to generate an output voltage from an input voltage; and
   a clock generator circuit coupled to provide a clock output at whose frequency the charge pump operates, wherein the frequency of the clock output is a decreasing function of the voltage level of the power supply external to the integrated circuit, wherein the clock generator circuit comprises:
      one or more delay elements having the clock output, an on-circuit high supply voltage level for the integrated circuit, a reference voltage and the voltage level of the power supply external to the integrated circuit as inputs and generating therefrom a delay that is an increasing function of the voltage level of the power supply external to the integrated circuit; and
      a latch circuit having as input the output of the one or more delay elements and as output the clock output.

2. The charge pump system of claim 1, wherein the delay of the one or more delay elements increases linearly with the voltage level of the external power supply.

3. The charge pump system of claim 1, wherein the integrated circuit further includes an array of memory cells and where the output voltage is used for an operation on said array.

4. The charge pump system of claim 3, wherein the memory cells are non-volatile memory cells and the output voltage is a programming voltage.

5. A charge pump system formed on an integrated circuit connectable to receive a voltage level from an external power supply, including:
   a charge pump to generate an output voltage from an input voltage; and
   a clock generator circuit coupled to provide a clock output at whose frequency the charge pump operates, wherein the frequency of the clock output is a decreasing function of the voltage level of the external power supply, wherein the clock generator circuit comprises:
      one or more delay elements having the clock output, an on-circuit high voltage level, and the voltage level of the external power supply as inputs and having a delay that is an increasing function of the voltage level of the external power supply; and
      a latch circuit having as input the output of the one or more delay elements and as output the clock output,
   wherein the one or more delay elements further have as input a reference voltage, each delay element including:
      a node;
      a differential amplifier having a first input connected to the node, a second input connected to receive the reference voltage, and an output supplying output of the delay circuit;
      a first capacitor connected between the on-circuit high voltage level and the node;
      a first switch connected between the on-circuit high voltage level and the node;
      a second capacitor having a first plate connected to the node;
      a second switch connected between the node and ground;
      a third switch connected to the second plate of the second capacitor
      a current source connected between the second switch and the node,
   wherein, when the output of the of the clock generator circuit has a first value, the first switch is closed, the second switch is open, and the third switch connects the second plate of the second capacitor to the on-circuit high voltage level, and, when the output of the of the clock generator circuit has a second value, the first switch is open, the second switch is closed, and the third switch connects the second plate of the second capacitor to the voltage level of the external power supply.

6. A method of of reducing power consumption in a charge pump system formed on an integrated circuit connectable to power supply external to the integrated circuit, comprising:
   receiving at a clock circuit the voltage level from the power supply external to the integrated circuit, an on-circuit high supply voltage level, and a reference voltage;
   generating in the clock circuit a clock signal having a frequency that is a decreasing function of the voltage level of the external power supply;
   providing the clock signal from the clock circuit to a charge pump; and
   operating the charge pump at said frequency to generate an output voltage from an input voltage, wherein generating the clock signal comprises:
      receiving at a delay element the clock signal and the voltage level of the power supply external to the integrated circuit, the on-circuit high supply voltage level, and the reference voltage;
      generating from the power supply external to the integrated circuit, the on-circuit high supply voltage level, and the reference voltage a delay that is an increasing function of the voltage level of the external power supply as output of the delay element;

receiving at a latch circuit the output of the delay element; and providing the clock signal as output of the latch circuit.

7. The method of claim 6, wherein the delay of the delay elements increases linearly with the voltage level of the external power supply.

8. The method of claim 6, wherein the integrated circuit further includes an array of memory cells, the method further comprising providing the output voltage to the array for performing an operation thereon.

9. The method of claim 8, wherein said operation is a programming operation.

* * * * *